Patented July 7, 1942

2,289,210

UNITED STATES PATENT OFFICE 2,289,210

SOLUBLE AZO DYE

William B. Reynolds, Chicago, Ill., and Swanie S. Rossander, Wilmington, Del., assignors to E. I. du Pont de Nemours & Company, Wilmington, Del., a corporation of Delaware No Drawing. Original application April 29, 1939, Serial No. 270,744. Divided and this application July 3, 1941, Serial No. 400,960

10 Claims. (Cl. 260—163)

This invention relates to soluble azo dyes which are especially suitable for dyeing wool and similar fibers in the one-bath chromate processes and especially to such dyes which are prepared by diazotizing a member of a class of mono-sulfo-amino-benzenes having an hydroxy or carboxy group ortho to the amino group and coupling with a nitro-phenyl-pyrazolone-carboxylic acid or ester.

Azo dyes have heretofore been made by coupling certain diazotized 2-amino-phenol-mono- or di-sulfonic acids with certain nitro-phenyl methyl-pyrazolones so as to have at least one sulfo group in each component. Dyeings made with such dyes do not have satisfactory levelness and there is a strong tendency to yellowish shades, especially among the red dyeings. There is considerable variation in the properties of the dyeings as between those made with the one-bath chromate and the afterchrome process, the one-bath chromate dyeings being less strong and less wet fast than the afterchrome dyeings. Other wool dyes have been made by coupling certain diazotized 2-amino-phenol derivatives to phenyl pyrazolones which are devoid of nitro groups, such as phenyl-methyl-pyrazolone, sulfo-phenyl-methyl-pyrazolone and phenyl-methyl-pyrazolone-carboxylic acid. These compounds are soluble dyes for wool which can be afterchromed but the compounds do not give dyeings which are desirably deep and bright shades and the dyeings do not have as good general fastness properties as are desired. Wool dyes are desired which will give level dyeings of good strength and good general strength and good general fastness properties in bluish shades, both in chromate and afterchrome processing, and especially when they are applied by the chromate process.

It is among the objects of the present invention to provide soluble azo dyes which give dyeings in bright deep level shades having improved fastness properties, such as fastness to fulling, washing, carbonizing, steaming, perspiration and sea salt when they are applied by the one-bath chromate process. Another object is to provide soluble azo dyes which are suitable for dyeing wool and similar fibers and which yield substantially similar results both in the chromate and afterchrome processes, yielding dyeings in deep yellows to bluish red shades. A further object of the invention is to provide metallized dyeings in strong bright shades which have improved fastness properties. These and other objects of the invention will be apparent from the following more detailed description.

The objects of the invention are attained in general by diazotizing a compound represented by the formula

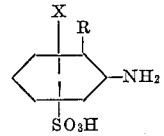

in which R is hydroxy or carboxy and X is one of a group consisting of hydrogen, alkyl, alkoxy, nitro, halogen and carboxy; and coupling with a nitro-phenyl-pyrazolone represented by the formula

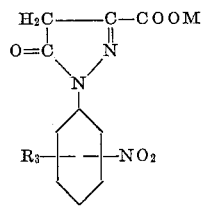

in which M is hydrogen or alkyl, $R_3$ is one of a group consisting of hydrogen, alkyl, alkoxy, nitro and halogen. The compounds in their acid form are represented in general by the formula

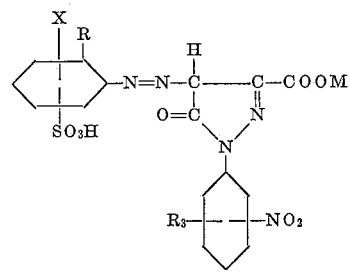

In general the dyebaths are acidified water solutions of the dyes and they usually contain Glauber's salt or an equivalent compound. Organic acids, such as acetic acid are generally used to acidify the baths. The fibers to be dyed are entered in the bath which is commonly heated. The dyeings are chromed by the methods well known in the art. Dyeings may also be made by the chromate process in which dyeings of similar strength and of similar properties are obtained.

EXAMPLE 24.9 parts of para-nitro-phenyl-5-pyrazolone-3-carboxylic acid were dissolved in 400 ml. of water by the addition of 30 parts of 10 Normal sodium-hydroxide solution and 50 parts of commercial soda ash. The temperature was adjusted to 25° C. 22.3 parts of 4-chloro-2-amino-phenol-6-sulfonic-acid were stirred with 10 ml. of 10 Normal sodium-hydroxide and 300 ml. of water until solution was complete. 35 ml. of 10 Normal hydrochloric acid were added and the suspension was cooled to 0-5° C. by the addition of ice. The amine was diazotized by the addition of 50 ml. of 2 Normal sodium-nitrite solution and was maintained with an excess of nitrite for 30 minutes.

The diazo solution was slowly added to the solution of 1-para-nitro-phenyl-5-pyrazolone-3-carboxylic acid over a period of 45 minutes. The resulting suspension was stirred for three hours, heated to 50° C. and the dye precipitated by the addition of 175 parts of common salt. The precipitated dye was filtered, and dried in an oven at 85° C. It formed a dark powder soluble in water to a brownish yellow solution dyeing wool a brownish yellow shade which chromed to a rich bluish shade of red having excellent fastness properties.

methyl-5-pyrazolone. The latter dyeings are yellow shades of red which are not as deep shades as the dyes of the invention and their fastness properties, such as light fastness and fastness to washing, fulling, perspiration and the like are not as good. The compound is represented by the formula

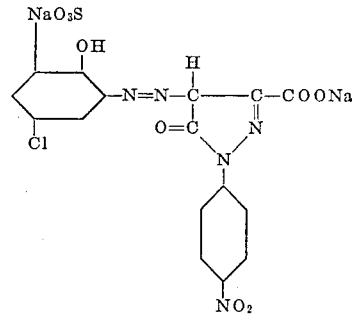

The illustrations shown in the following table were made by procedures essentially the same as that given in the example and the dyeings have similar improved properties.

Table I

| Example | Diazo component | Coupling component | Direct shade on wool | Chromed shade on wool |
| --- | --- | --- | --- | --- |
| 2 | 4-chloro-2-amino-phenol-6-sulfonic acid | 1-meta-nitro-phenyl-5-pyrazolone-3-carboxylic acid. | Brownish yellow | Red. |
| 3 | 6-chlor-2-amino-phenol-4-sulfonic acid | 1-para-nitro-phenyl-5-pyrazolone-3-carboxylic acid | Red brown | Yellowish red. |
| 4 | 6-nitro-2-amino-phenol-4-sulfonic acid | ...do... | Blue red | Reddish orange. |
| 5 | 4-nitro-2-amino-phenol-6-sulfonic acid | 1-para-nitro-phenyl-5-pyrazolone-3-carboxylic acid. | Reddish orange | Orange. |
| 6 | 4-chlor-2-amino-phenol-6-sulfonic acid | 1-(2'-chlor-4'-nitro-phenyl)-5-pyrazolone-3-carboxylic acid. | Brownish yellow | Yellowish red. |
| 7 | 6-chlor-2-amino-phenol-4-sulfonic acid | ...do... | Orange | Orange. |
| 8 | 6-nitro-2-amino-phenol-4-sulfonic acid | ...do... | Red | Do. |
| 9 | 4-chlor-2-amino-phenol-6-sulfonic acid | 1-(2'-methoxy-4'-nitro-phenyl)-5-pyrazolone-3-carboxylic acid. | Brownish yellow | Red. |
| 10 | 6-chlor-2-amino-phenol-4-sulfonic acid | ...do... | Orange | Orange. |
| 11 | 6-nitro-2-amino-phenol-4-sulfonic acid | ...do... | Red | Do. |
| 12 | 4-chlor-2-amino-phenol-6-sulfonic acid | 1-para-nitro-phenyl-5-pyrazolone-3-carboxylic acid ethyl ester. | Brownish yellow | Red. |
| 13 | 6 - chlor - 2 - amino - phenol - 4 - sulfonic acid. | ...do... | Orange | Orange |
| 14 | 6 - nitro - 2 - amino - phenol - 4 - sulfonic acid. | ...do... | Red | Do. |
| 15 | 4 - chlor - 2 - amino - phenol - 6 - sulfonic acid. | 1-(2'-4'-dinitro-phenyl)-5-pyrazolone-3-carboxylic acid. | Brownish yellow | Brownish red. |
| 16 | 6 - chlor - 2 - amino - phenol - 4 - sulfonic acid. | ...do... | Brownish orange | Brownish orange |
| 17 | 6 - nitro - 2 - amino - phenol - 4 - sulfonic acid. | ...do... | Red | Orange. |
| 18 | 4 - chlor - 2 - amino - phenol - 6 - sulfonic acid. | 1-(2'-methoxy-5'-nitro-phenyl)-5-pyrazolone-3-carboxylic acid. | Brownish yellow | Red. |
| 19 | 6 - chlor - 2 - amino - phenol - 4 - sulfonic acid. | ...do... | Brownish orange | Orange. |
| 20 | 6 - nitro - 2 - amino - phenol - 4 - sulfonic acid. | ...do... | Red | Do. |
| 21 | 4 - chlor - 2 - amino - phenol - 6 - sulfonic acid. | 1, 2'-methyl-4'-nitro-phenyl-5-pyrazolone-3-carboxylic acid. | Brownish yellow | Red. |
| 22 | 6 - chlor - 2 - amino - phenol - 4 - sulfonic acid. | ...do... | Brownish orange | Orange. |
| 23 | 6 - nitro - 2 - amino - phenol - 4 - sulfonic acid. | ...do... | Red | Do. |
| 24 | 4 - chlor - 2 - amino - phenol - 5 - sulfonic acid. | 1 - para - nitro - phenyl - 5 - pyrazolone - 3 - carboxylic acid. | Brownish yellow | Red. |
| 25 | 4 - sulfo - 6 - chloro - 2 - amino benzoic acid. | 1-(4'-nitro-phenyl)-5-pyrazolone-3-carboxylic acid. | Yellow | Yellow. |
| 26 | ...do... | 1-(3'-nitro-phenyl)-5-pyrazolone-3-carboxylic acid. | ...do... | Do. |
| 27 | ...do... | 1-(4'-nitro-phenyl)-5-pyrazolone-3-carboxylic acid ethyl ester. | ...do... | Do. |
| 28 | 4 - methyl - 6 - sulfo - 2 - amino benzoic acid. | 1-(4'-nitro-phenyl)-5-pyrazolone-3-carboxylic acid. | ...do... | Do. |
| 29 | ...do... | 1 - (3'- nitro - phenyl) - 5 - pyrazolone - 3 - carboxylic acid. | ...do... | Do. |

The dyeings are appreciably superior in brightness and general fastness properties to dyeings made in like manner with the product obtained by similarly coupling the diazo of 4-chlor-2-amino-phenol-6-sulfonic-acid with phenyl-3-

Among the many suitable 2-amino-phenols and 2-amino-benzoic acids which can be used, the following are mentioned as illustrative: 2-amino-phenol-4-sulfonic, 4-chlor-2-amino-phenol-6-sulfonic acid, 4-chlor-2-amino-phenol-5-sulfonic acid, 6-chlor-2-amino-phenol-4-sulfonic acid, 4-nitro-2-amino-phenol-6-sulfonic acid, 6-nitro-2-amino-phenol-4-sulfonic acid, 2-hydroxy-3-amino-5-sulfo-benzoic acid, 4-methyl-2-amino phenol-6-sulfonic acid, 4-sulfo-6-chlor-2-amino-benzoic acid, 4-methyl-6-sulfo-2-amino benzoic acid and 4-methoxy-2-amino-phenol-6-sulfonic acid.

As illustrations of typical coupling components the following are mentioned but others can be used: 1-(para-nitro-phenyl) - 5 - pyrazolone-3-carboxylic acid, 1-(2',4'-dinitro-phenyl)-5-pyrazolone-3-carboxylic acid, 1-(2'-chloro-4'-nitrophenyl)-5-pyrazolone-3-carboxylic acid, 1-(2'-methoxy-4'-nitro-phenyl) - 5 - pyrazolone-3-carboxylic acid, 1-(2'-methoxy-5'-nitro-phenyl)-5-pyrazolone-3-carboxylic acid, 1-(2'-methyl-4'-nitro-phenyl)-5-pyrazolone - 3 - carboxylic acid and 1-(p-nitro-phenyl)-5-pyrazolone-3-carboxylic acid ethyl ester.

The alkyl and alkoxy derivatives of the primary aryl amines comprise those indicated by the general formula having straight and branched chain alkyl and alkoxy substituents of one to four carbons, such as methyl, ethyl, isopropyl and butyl substituted derivatives. The pyrazolone derivatives which are similarly substituted in the phenyl nucleus are also suitable, such as 1-(3'-nitro-4'-butyl-phenyl) - pyrazolone - 3-carboxylic acid and the methyl, ethyl, propyl and butyl esters of such pyrazolones. Any of the indicated 1-(nitro-phenyl)-5-pyrazolone-3-carboxylic acid esters are suitable in which the ester group is a branched or straight chain alkyl having one to four carbons, such as the ethyl, propyl and isobutyl esters.

The compounds made by coupling the indicated diazotized primary aryl amines with the described 1-(nitro-phenyl)-5-pyrazolone-3-carboxylic acids and the described esters of said pyrazolone carboxylic acids produce dyeings on wool which are similar in structure to those which are devoid of nitro groups in the phenyl nucleus of the pyrazolone. The chromed dyeings are generally deeper, the reds are bluer, and the dyeings are superior to the dyeings made with dyes which contain no nitro group in the phenyl nucleus of the pyrazolone with respect to wet fastness properties, such as fastness from subjecting to washing, fulling, perspiration and salt solutions. With many of the products improved fastness to wet steaming and sulfuric acid carbonizing were also noted.

Dyeings with the deepest shades and best fastness properties are obtained from among the diazo compounds in which the lake forming group is hydroxy.

The monazo compounds can be produced in the form of acids or salts. It is generally convenient to isolate them as alkali salts, such as the ammonium or alkali metal salts, and the acid forms of the products can then be obtained by acidifying water solutions of such salts.

This application is a divison of our application Serial Number 270,744, filed April 29, 1939, and is a continuation-in-part in so far as various additional specific illustrations of the invention described and claimed in said parent case were added upon filing the present specification.

From the foregoing disclosure it will be recognized that the invention is susceptible of modification without departing from the spirit and scope thereof and it is to be understood that the invention is not restricted to the specific illustrations thereof herein set forth.

We claim:

1. A dye which in the form of its acid is represented by the formula

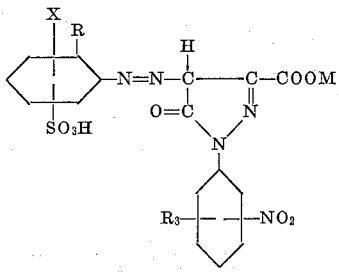

wherein R is one of a group consisting of hydroxy and carboxy; X is one of a group consisting of hydrogen, alkyl, alkoxy, nitro, halogen and carboxy; $R_3$ is one of a group consisting of hydrogen, alkyl, nitro, alkoxy and halogen; M is one of a group consisting of hydrogen and alkyl, and characterized in that alkyl and alkoxy contain 1 to 4 carbons.

2. A dye which in the form of its acid is represented by the formula

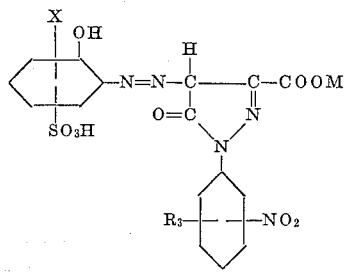

wherein X is one of a group consisting of hydrogen, alkyl, alkoxy, nitro, halogen and carboxy; $R_3$ is one of a group consisting of hydrogen, alkyl, alkoxy, nitro and halogen; M is one of a group consisting of hydrogen and alkyl, and characterized in that alkyl and alkoxy contain 1 to 4 carbons.

3. The dye which in the form of its acid is represented by the formula

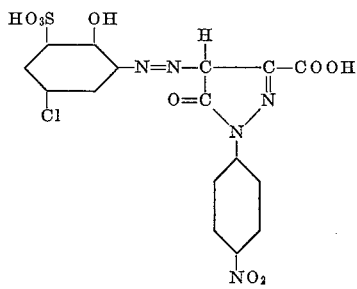

4. The dye which in the form of its acid is represented by the formula

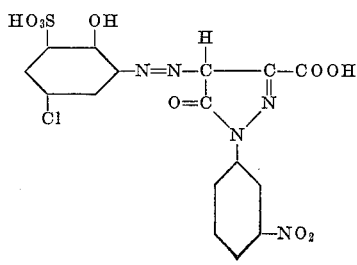

5. The dye which in the form of its acid is represented by the formula

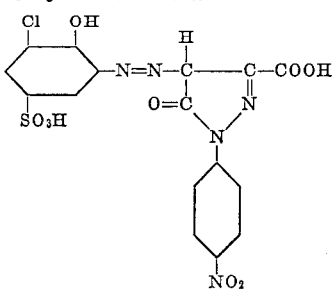

6. The process which comprises diazotizing a compound represented by the formula

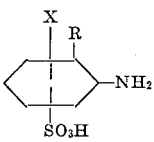

in which R is one of a group consisting of hydroxy and carboxy, and X is one of a group consisting of hydrogen, alkyl, alkoxy, nitro, halogen and carboxy; coupling said diazotized base with a compound represented by the formula

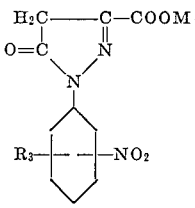

in which M is one of a group consisting of hydrogen and alkyl and R₃ is one of a group consisting of hydrogen, alkyl, alkoxy, nitro and halogen; alkyl and alkoxy in said compounds having one to four carbons; and separating the compound thus formed from a basic medium.

7. The process which comprises diazotizing a compound represented by the formula

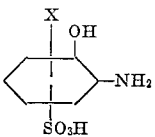

in which X is one of a group consisting of hydrogen, alkyl, alkoxy, nitro, halogen and carboxy; and coupling with a compound represented by the formula

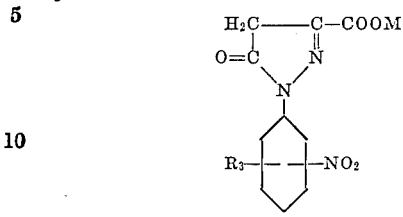

in which M is one of a group consisting of hydrogen and alkyl and R₃ is one of a group consisting of hydrogen, alkyl, alkoxy, nitro and halogen; alkyl and alkoxy in said compounds having one to four carbons; and separating the compound thus formed from a basic medium.

8. The process which comprises diazotizing 4-chloro-2-amino-phenol-6-sulfonic acid, adding the diazo at coupling temperatures to a basic solution of para-nitro-phenyl-5-pyrazolone-3-carboxylic acid, maintaining the mixture at coupling temperatures until a coupling product of equimolecular proportions of said compounds is formed, and then separating the product of coupling from the coupling medium.

9. The process which comprises diazotizing 4-chloro-2-amino-phenol-6-sulfonic acid, adding the diazo at coupling temperatures to a basic solution of meta-nitro-phenyl-5-pyrazolone-3-carboxylic acid, maintaining the mixture at coupling temperatures until a coupling product of equimolecular proportions of said compounds is formed, and then separating the product of coupling from the coupling medium.

10. The process which comprises diazotizing 6-chloro-2-amino-phenol-4-sulfonic acid, adding the diazo at coupling temperatures to a basic solution of para-nitro-phenyl-5-pyrazolone-3-carboxylic acid, maintaining the mixture at coupling temperatures until a coupling product of equimolecular proportions of said compounds is formed, and then separating the product of coupling from the coupling medium.

WILLIAM B. REYNOLDS.
SWANIE S. ROSSANDER.